(12) United States Patent
Dai

(10) Patent No.: US 8,760,968 B2
(45) Date of Patent: Jun. 24, 2014

(54) DETERMINING A QUANTITY OF A GIVEN MATERIAL IN A SUBTERRANEAN STRUCTURE

(75) Inventor: Jianchun Dai, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 460 days.

(21) Appl. No.: 13/118,162

(22) Filed: May 27, 2011

(65) Prior Publication Data

US 2011/0292767 A1 Dec. 1, 2011

Related U.S. Application Data

(60) Provisional application No. 61/349,086, filed on May 27, 2010.

(51) Int. Cl.
*G01V 1/00* (2006.01)
*G01V 1/28* (2006.01)

(52) U.S. Cl.
CPC ..................... *G01V 1/282* (2013.01)
USPC .......................................... 367/73

(58) Field of Classification Search
CPC ..................... G01V 1/282
USPC ..................... 367/73; 702/13, 181
See application file for complete search history.

(56) References Cited

U.S. PATENT DOCUMENTS

| | | | | |
|---|---|---|---|---|
| 5,587,968 A | * | 12/1996 | Barr | 367/75 |
| 6,424,920 B1 | * | 7/2002 | Osypov | 702/18 |
| 6,839,658 B2 | * | 1/2005 | Causse et al. | 702/182 |
| 6,917,564 B2 | * | 7/2005 | Leaney | 367/73 |
| 8,090,555 B2 | * | 1/2012 | Dai et al. | 702/181 |
| 2006/0153005 A1 | * | 7/2006 | Herwanger et al. | 367/38 |
| 2006/0212225 A1 | * | 9/2006 | Bachrach et al. | 702/14 |
| 2008/0294347 A1 | * | 11/2008 | Robertsson et al. | 702/17 |
| 2009/0274005 A1 | * | 11/2009 | Hansteen et al. | 367/21 |

FOREIGN PATENT DOCUMENTS

WO  2011150387 A2  12/2011

OTHER PUBLICATIONS

International Search Report and Written Opinion of PCT/US11/038431 dated Feb. 9, 2012.
Collett, T., M., Riedel, R. Boswell, J. R., Cochran, P. Kumar, A. Sethi, A. Sathe, International Team Completes Landmark Gas Hydrate Expedition in the Offshore of Inidia, NETL, Fall, 2006.
Dai, J., Xu, H. Snyder, F., Dutta, N., 2004. Detection and estimation of gas hydrates using rock physics and seismic inversion: Examples from the northern deepwater Gulf of Mexico, The Leading Edge, 23, p. 60-66.
Dai, J., Snyder, F., Gillespie, D., Koesoemadinata, A., Dutta, N., 2008a. Exploration for gas hydrates in the deepwater northern Gulf of Mexico: part I. A seismic approach based on geologic model, inversion and rock physics principles. Mar. Petr. Geol. 25, 830-844.

(Continued)

*Primary Examiner* — Luke Ratcliffe
*Assistant Examiner* — Hovhannes Baghdasaryan

(57) ABSTRACT

A profile is produced based on measured survey data, where the profile contains indications corresponding to refraction events at different depths in a subterranean structure. Based on the profile and a critical angle model that correlates different concentrations of a given material to respective critical angles, a quantity of the given material in a subterranean structure at a particular depth is determined.

21 Claims, 7 Drawing Sheets

(56) References Cited

OTHER PUBLICATIONS

Dai, J., Banik, N., Gillespie, D., Dutta, N., 2008. Exploration for gas hydrates in the deepwater, northern Gulf of Mexico: part II. Model validation by drilling. Mar. Petr. Geol. 25, 845-859.

Shelander, D., J. Dai, and G. Bunge. Predicting saturation of gas hydratesusing pre-stack seismic data, Gulf of Mexico, in press, Journal of Marine Geophysical Researches, 2010.

Dvorkin, J., Nur A., 1996. Elasticity of high-porosity sandstones: Theory for two North Sea data sets. Geophysics, 61, 1363-1370.

Helgerud, M.B., Dvorkin, J., Nur, A., Sakai, A., Collett, T.S., 1999. Elastic-wave velocity in marine sediments with gas hydrates: effective medium modeling. Geophys. Res. Lett. 26, 2021-2024.

Kvenvolden, K., Barnard, L., 1983. Hydrates of natural gas in continental margins. In: Watkins, J. Drake, C. (Eds), Studies in Continental Margin Geology, AAPG Memoir 34, 631-640.

Kvenvolden, K.A., 1998. A primer on the geological occurrence of gas hydrate. In: Henriet, J.-P. & Mienert, J. (eds) Gas Hydrates: Relevance to World Margin Stability and Climate Change. Geological Society, London, Special Publications, 137, pp. 9-30.

\* cited by examiner

DETERMINING A QUANTITY OF A GIVEN MATERIAL IN A SUBTERRANEAN STRUCTURE

CROSS REFERENCE TO RELATED APPLICATION

This application claims the benefit under 35 U.S.C. §119 (e) of U.S. Provisional Application Ser. No. 61/349,086, entitled "METHOD TO IDENTIFY, LOCATE AND QUANTIFY GAS HYDRATE," filed May 27, 2010, which is hereby incorporated by reference.

BACKGROUND

Survey operations can be performed to characterize a subterranean structure. The subterranean structure may include one or more subterranean elements of interest, such as hydrocarbon-bearing reservoirs, fresh water aquifers, gas injection zones, or other types of subterranean elements.

In some implementations, seismic surveying can be performed, in which one or more seismic sources are activated to produce seismic waves that are propagated into the subterranean structure. Portions of the seismic waves are reflected from the subterranean structure and received by seismic sensors. Seismic data measured by the seismic sensors are collected and processed to determine various properties of the subterranean structure.

Traditional seismic surveying has focused on identifying subterranean elements of interest at relatively large depths, such as several kilometers below the earth surface (e.g. land surface or sea floor). More recently, seismic survey techniques have also been applied to characterize content of a shallow portion of a subterranean structure (the portion of the subterranean structure extending from the earth surface to some target shallow depth (e.g. a few hundred meters below the earth surface). However, conventional techniques of performing seismic characterization of the shallow portion of a subterranean structure may not produce accurate results.

SUMMARY

In general, according to some embodiments, a method comprises producing a profile based on measured survey data, where the profile contains indications corresponding to refraction events at different depths in a subterranean structure. Based on the profile and a critical angle model that correlates different concentrations of a given material to respective critical angles, a quantity of the given material in a subterranean structure at a particular depth is determined.

In general, according to further embodiments, a system includes a storage medium to store measurement data acquired during a subterranean survey operation. The system further includes at least one processor that is configured to produce a profile based on the measurement data, where the profile contains indications corresponding to refraction events at different depths in a subterranean structure. The at least one processor is further configured to create a critical angle model that correlates different concentrations of a given material to respective critical angles, and determine, based on the profile and the critical angle model, a quantity of the given material in a subterranean structure at a particular depth.

In general, according to yet further embodiments, an article includes at least one machine-readable storage medium storing instructions that upon execution cause at least one processor to produce a critical angle profile based on measured survey data, where the critical angle profile includes one or more critical angles in the subterranean structure at different depths. Based on the critical angle profile and a critical angle model that correlates different concentrations of a given material to respective critical angles, quantities of the given material in a subterranean structure at respective depths are determined.

In further or alternative implementations, at least one of the one or more critical angles in the critical angle profile is correlated to curves of the critical angle model corresponding to the different concentrations, where one or more of the curves map critical angle to depth.

In further or alternative implementations, when a first critical angle in the critical angle profile cannot be mapped directly onto any of the curves of the critical angle model, interpolation is performed to determine a quantity of the given material corresponding to the first critical angle in the critical angle profile.

In further or alternative implementations, seismic traces corresponding to respective different angles of incidence of source seismic waves are received, and the one or more critical angles at the different depths are estimated based on the refraction events indicated by the seismic traces.

In further or alternative implementations, using the critical angle model, inversion of the profile to derive the quantity of the given material in the subterranean structure at the particular depth is performed.

In further or alternative implementations, the inversion is an inversion according to a Bayesian technique.

In further or alternative implementations, a rock physics model of the subterranean structure is created that accounts for different concentrations of the given material in the subterranean structure.

In further or alternative implementations, creating the rock physics model includes mapping velocities of seismic waves to depth for different concentrations of the given material in the subterranean structure.

In further or alternative implementations, the critical angle model is produced based on the rock physics model.

In further or alternative implementations, determining the quantity of the given material includes determining the quantity of a gas hydrate.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
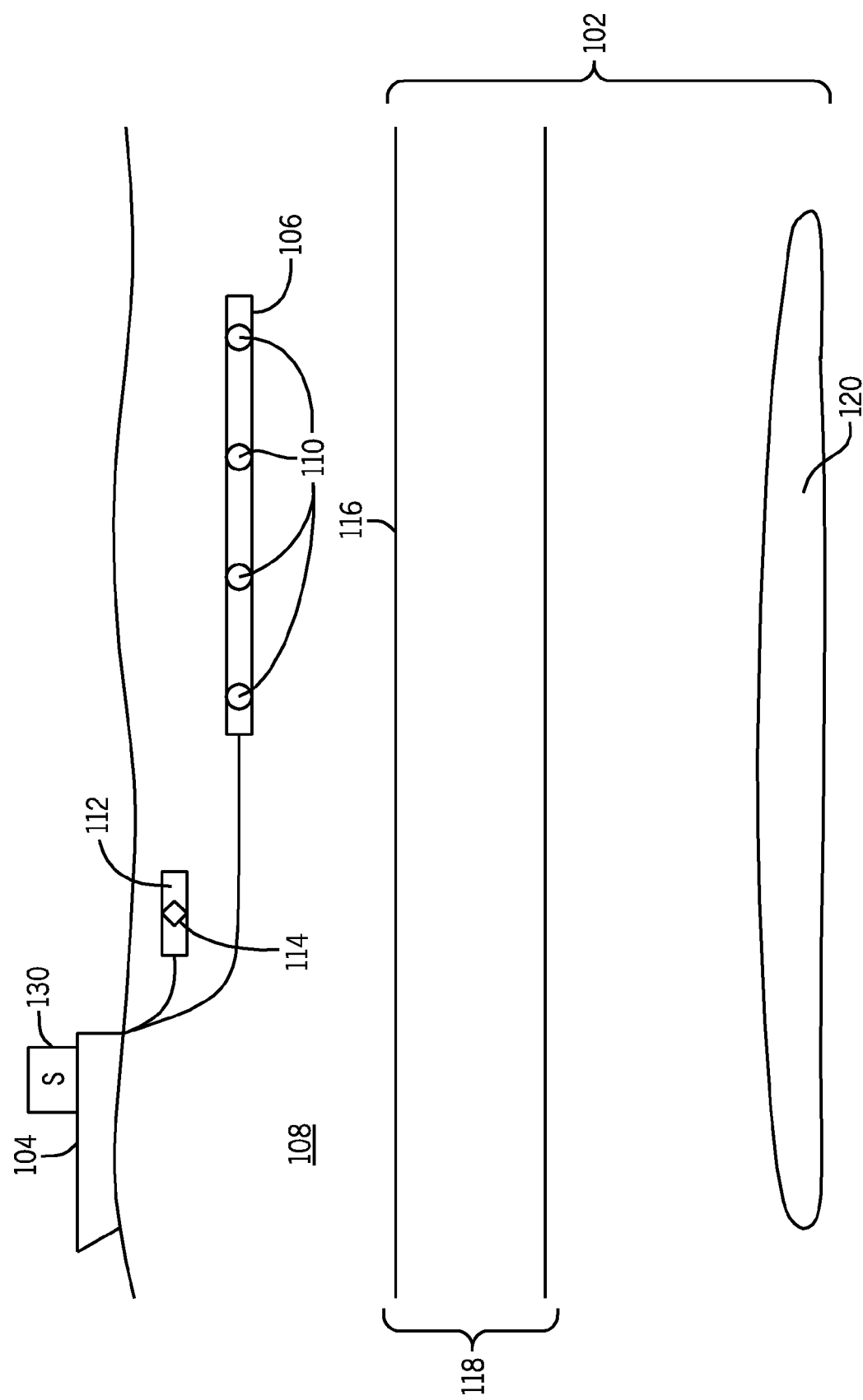
FIG. 1 is a schematic diagram of an example arrangement for performing a seismic survey operation, in accordance with some implementations.

FIG. 1 is a schematic diagram of an example arrangement for performing a marine survey of a subterranean structure 102. Although reference is made to a marine survey arrangement as shown in FIG. 1, note that techniques or mechanisms according to some embodiments can also be applied to land-based survey arrangements.

In the example of FIG. 1, marine survey equipment includes a marine vessel 104 that tows a streamer 106 through a body of water 108. The streamer 106 includes a number of survey sensors 110. The marine vessel 104 (or a different marine vessel) can tow a survey source assembly 112, which has one or more survey sources 114. In some implementations, the survey source 114 is a seismic source, and the survey sensors 110 are seismic sensors.

The subterranean structure 102 being surveyed is located below a water bottom surface (e.g. sea floor 116). A shallow sediment layer 118 (which has a relatively shallow depth below the bottom surface 116) can include a given material (e.g. gas hydrate or other material) that may be of interest to an operator. The shallow depth of the sediment layer 118 can be any depth that is less than 500 meters, for example. In other examples, the sediment layer 118 can have other depths below the bottom surface 116, such as a depth of less than 1000 meters, 1500 meters, 2000 meters, and so forth. Although reference is made to a "sediment layer" note that the sediment layer 118 can actually be made up of multiple sublayers, including sand sublayers, shale sublayers, and so forth. For example, the sediment layer 118 can include a shale background that contains sand sublayers, where the sand sublayers can contain a gas hydrate. In such example, the sediment layer 118 will be made up of shale sublayers and sand sublayers.

The subterranean structure 102 also includes at least one subterranean element of interest 120 (e.g. hydrocarbon reservoir, fresh water aquifer, etc.) that is at a greater depth than the sediment layer 118.

In operation, a seismic wave generated by the seismic source 114 is propagated generally downwardly into the subterranean structure 102. A portion of the seismic wave is reflected from the subterranean structure 102, and propagates generally upwardly toward the streamer 106. The upwardly-propagated seismic wave is detected by the seismic sensors 110 of the streamer 106.

FIG. 1 further depicts a control system 130 deployed at the marine vessel 104. The control system 130 can be used to control activation of the seismic source 114. The control system 130 can also receive measurement data collected by the seismic sensors 110. In some examples, the control system 130 is able to process the collected measurement data, such as to determine quantities of a given material (e.g. gas hydrate, etc.) in the sediment layer 118. In alternative examples, the collected measurement data from the seismic sensors 110 can be communicated to a remote system for further processing.

In some examples, an operator may wish to identify quantities (e.g. concentrations) of a gas hydrate in the sediment layer 118. A gas hydrate is an ice-like compound of natural gas, such as methane, and water formed under relatively low temperature and relatively high pressure. Gas hydrates are considered as both potential sources of clean energy and as hazardous materials. For example, during a drilling operation into the subterranean structure 102, the presence of relatively large quantities of gas hydrates in the sediment layer 118 can be hazardous since explosions can occur due to reactions with the gas hydrates. However, in other applications, it is also possible to produce such gas hydrates for use as an energy source.

Traditional techniques of identifying and quantifying a gas hydrate in the sediment layer 118 relies on use of near offset survey data (where near offset survey data refers to survey data collected based on relatively small offsets between a seismic source and a seismic sensor). Such traditional techniques may not provide the level of accuracy that may be desired.

Figure 2:
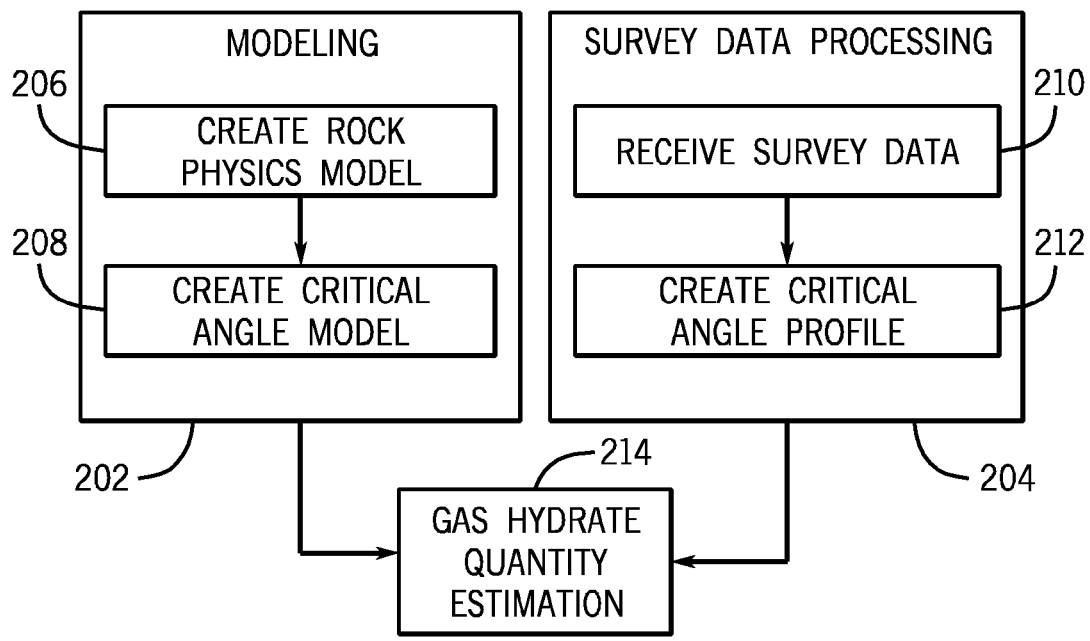
FIG. 2 is a flow diagram of a process of estimating a concentration of a given material in a subterranean structure, according to some embodiments.

In accordance with some embodiments, techniques or mechanisms do not rely on near offset survey data. As a result, improved data accuracy and robustness can be achieved. FIG. 2 is a flow diagram of a process according to some embodiments for identifying and quantifying a given material (e.g. gas hydrate) in a subterranean structure (such as in the shallow sediment layer 118 of the subterranean structure 102). In the ensuing discussion, reference is made to identifying and quantifying gas hydrates; however, in alternative implementations, techniques or mechanisms can be applied for identifying other types of materials in the sediment layer 118.

The process of FIG. 2 relies upon modeling (202) of critical angles in the sediment layer 118 in the subterranean structure 102, and applying such modeling to a profile created based on survey data processing (204) to estimate quantities of a gas hydrate. The concept of a "critical angle" is discussed further below in connection with FIG. 3.

More specifically, the modeling (202) of FIG. 2 involves creating (at 106) a rock physics model of the sediment layer 118. The rock physics model (also referred to as an elastic model) accounts for different concentrations of the gas hydrate in the sediment layer 118. More specifically, the rock physics model correlates velocities of seismic waves with different concentrations of the gas hydrate in the sediment layer 118. Further details regarding the rock physics model are discussed below.

The modeling (202) also involves creating (at 208), based on the rock physics model, a critical angle model. The critical angle model correlates critical angles to different concentrations of a gas hydrate. The term "critical angle" is explained further below.

In the survey data processing (204), survey data acquired using the survey arrangement of FIG. 1 is received (at 210). Based on the received survey data, a critical angle profile is created (at 212). The critical angle profile includes critical angles at different depths of the sediment layer 118. More generally, the profile created (at 212) includes indications of refraction events in the sediment layer 118. The refraction events are associated with sharp amplitude and phase changes in the survey data resulting from reflections of seismic waves in the subterranean structure at boundaries between different sublayers, such as between a sand sublayer containing a gas hydrate and a shale sublayer.

The critical angle model 208 and critical angle profile 212 can be used to perform gas hydrate quantity estimation (214). The gas hydrate quantity estimation (214) can estimate different quantities of gas hydrate at different depths of the sediment layer 118. For example, a concentration of the gas hydrate (amount of the gas hydrate in a given volume of the sediment layer) can be determined. In an alternative example, a percentage of saturation of gas hydrate within the sediment layer at a particular depth can be determined.

Figure 3:
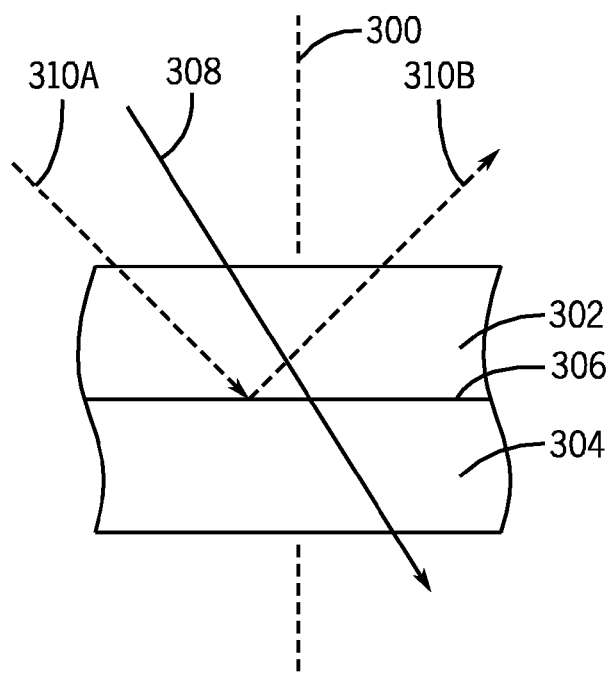
FIG. 3 illustrates waves incident on a boundary between different sublayers in a subterranean structure.

The concept of a critical angle is described in connection with FIG. 3. FIG. 3 shows two sublayers 302 and 304 in the sediment layer 118 of FIG. 1. The upper sublayer 302 can have a lower velocity (for wave propagation) than the lower sublayer 304. An angle of incidence of an incoming wave (e.g. a source seismic wave produced by the seismic source 114 of FIG. 1) refers to an angle between a direction of propagation of the wave (such as indicated by arrow 310A or 308) and a vertical axis 300. The critical angle is the angle of incidence of the incoming wave where the entirety of the wave is reflected at the interface 306 between the sublayers 302 and 304. In the example of FIG. 3, the solid arrow 308 represents propagation of an incoming wave at an angle of incidence that is less than the critical angle—in this case, the wave can pass through from the upper sublayer 302 to the lower sublayer 304. On the other hand, the dashed arrow 310A represents an incoming wave at an angle of incidence that is equal to or greater than the critical angle, in which case the incoming wave (represented by arrow 310A) is reflected at the interface 306, where the reflected seismic wave is represented as 310B.

The creation of the rock physics model (206) in FIG. 2 is discussed in connection with FIGS. 4A and 4B. In some implementations, the rock physics modeling treats a gas hydrate as being part of a load-bearing matrix. A load-bearing matrix represents a sediment formation that has a porosity, such that pores are formed in the sediment formation. The pores of the sediment formation can be filled with another material, such as water (e.g. brine) or gas hydrate. The introduction of gas hydrate into the sediment formation would reduce the porosity of the sediment formation and enhance both the stiffness and rigidity of the sediment formation.

To build a rock physics model, a velocity profile for the sediment formation filled with water (e.g. brine) is first defined. The pores of the sediment formation are then replaced with a gas hydrate, and the corresponding velocity profile is then estimated using any suitable method, including without limitation, effective theory method (ETM), as described by Jack Dvorkin et al. "Elasticity of High-Porosity Sandstones: Theory for Two North Sea Datasets," Geophysics, Vol. 61, pp. 1363-1370 (1996), for example. Note that different velocity profiles can be derived for different concentrations (or saturation levels) of gas hydrate in the sediment formation. In other implementations, other techniques for building velocity profiles for different concentrations of gas hydrate can be used.

Figure 4B:
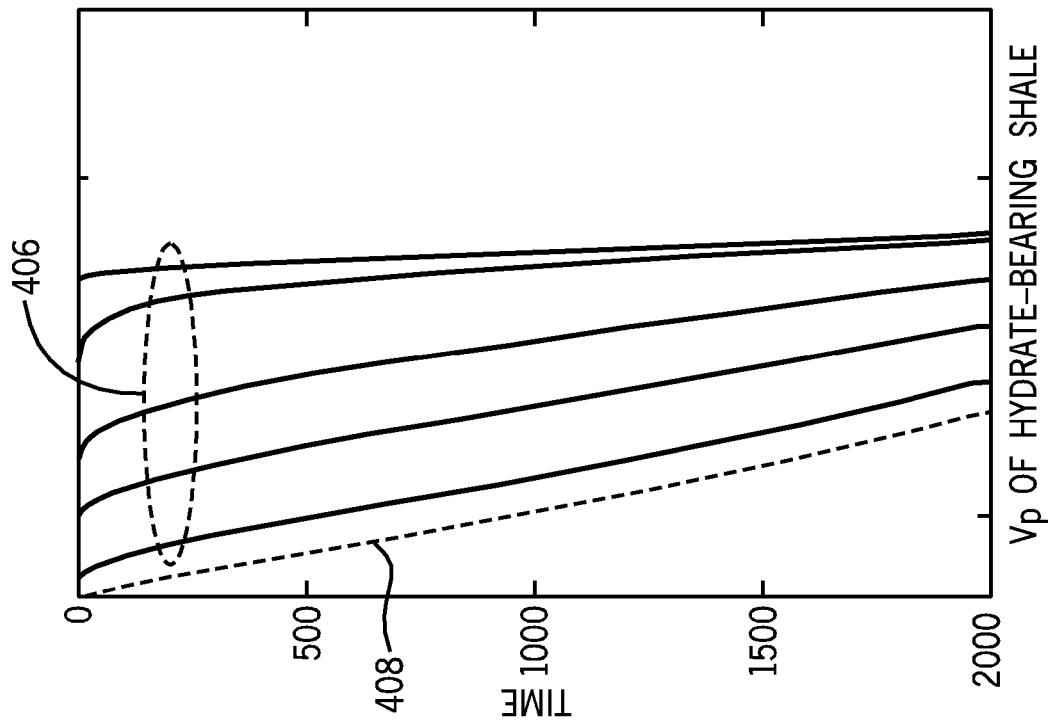
FIGS. 4A-4B illustrate example velocity models of gas hydrate-bearing sediment layers, produced according to some embodiments.
Figure 4A:
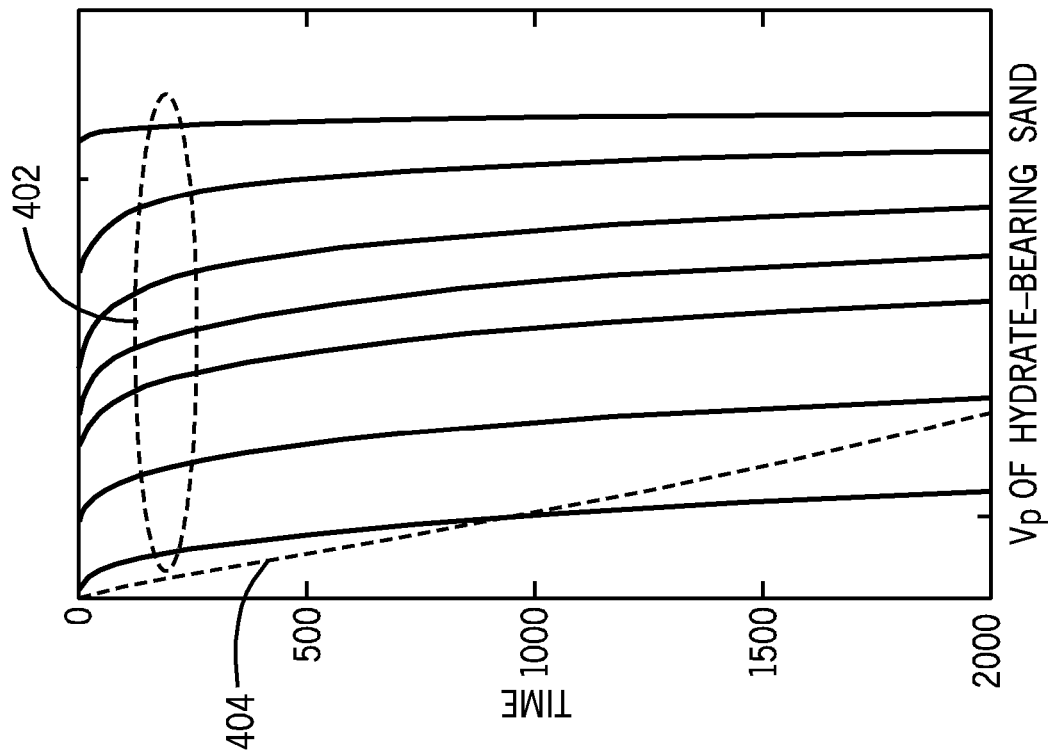

FIGS. 4A-4B are exemplary graphs illustrating velocity (Vp) profiles of hydrate-bearing sand and hydrate-bearing shale, respectively. Each graph in FIG. 4A or 4B plots the velocity (Vp) of a P-wave (on the horizontal axis) as a function of time (on the vertical axis). The time represents the time of propagation into the sediment layer. Time 0 on the vertical axis represents the earth surface (e.g. 116 in FIG. 1); increasing time on the vertical axis refers to increasing depth from the earth surface in the subterranean structure. In alternative examples, instead of plotting time on the vertical axis, the time values can be converted to depth of the sediment layer.

A P-wave that propagates in a subterranean structure refers to a compression seismic wave, which moves with a compressional motion (along a direction of propagation of the wave). A P-wave is contrasted with an S-wave, which moves in a shear direction that is perpendicular to the direction of propagation.

In FIG. 4A, several curves (referred to collectively as set 402) represent respective Vp profiles as a function of time (depth) for corresponding different concentrations of gas hydrate in a hydrate-bearing sand formation. Although just some curves are illustrated in FIG. 4A, note that there can be a much larger number of curves corresponding to different concentrations of gas hydrate. The left-most curve in the set 402 represents a gas hydrate saturation of 0%, whereas the right-most curve in the set 402 represents gas hydrate saturation of 100%. A gas hydrate saturation of 0% means that the sediment formation does not contain any gas hydrate, whereas a gas hydrate saturation of 100% means that the pores of the sediment formation are completely filled with gas hydrate. The intermediate curves of the set 402 represent varying levels of saturation (between 0% and 100%) of gas hydrate moving, where the saturation levels increase from left to right in the set 402.

A dashed curve 404 in FIG. 4A represents the velocity (Vp) profile of the sand formation assuming the pores of the sand are filled with water (e.g. brine).

The velocity profiles shown in FIG. 4B are similar to those of FIG. 4A, except the curves in a set 406 of FIG. 4B represents different levels of saturation of gas hydrate in a hydrate-bearing shale formation (as opposed to the sand formation represented by FIG. 4A). The left-most curve in the set 406 represents 0% saturation, whereas the right-most curve in the set 406 represents 100% saturation. A dashed curve 408 in FIG. 4B represents the background velocity profile (the shale formation filled with water).

The curves in each set 402 or 406 depicting the velocity profile of the hydrate-bearing sediment formation as a function of time form the rock physics model created at 206 in FIG. 2, according to some implementations. In other implementations, other types of rock physics models can be built.

Figure 5B:
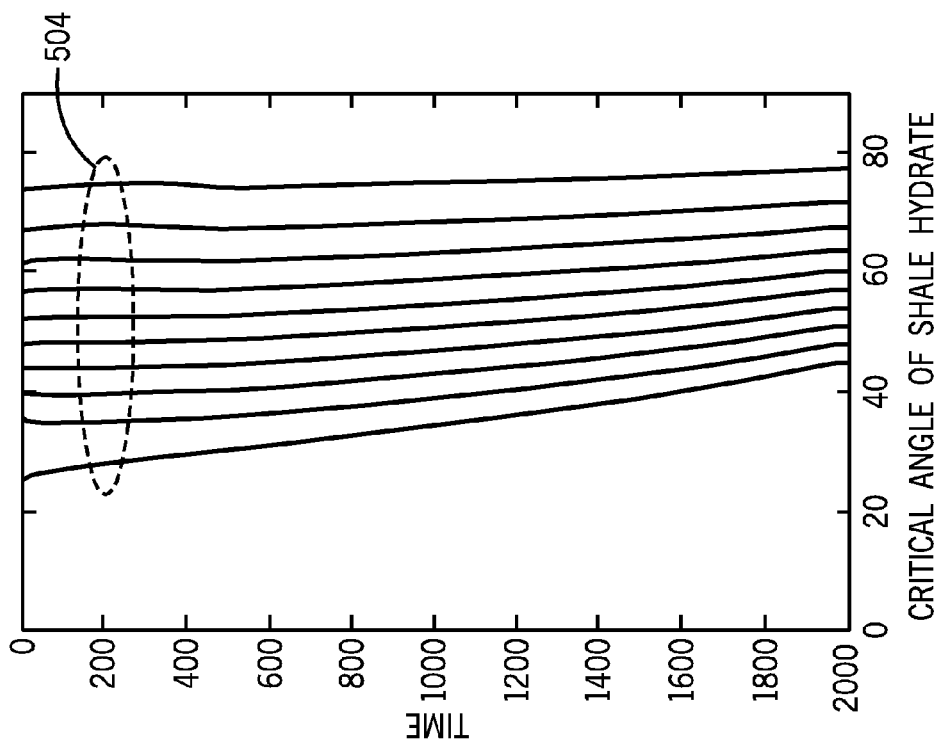
FIGS. 5A-5B illustrate critical angle models, produced according to some embodiments.
Figure 5A:
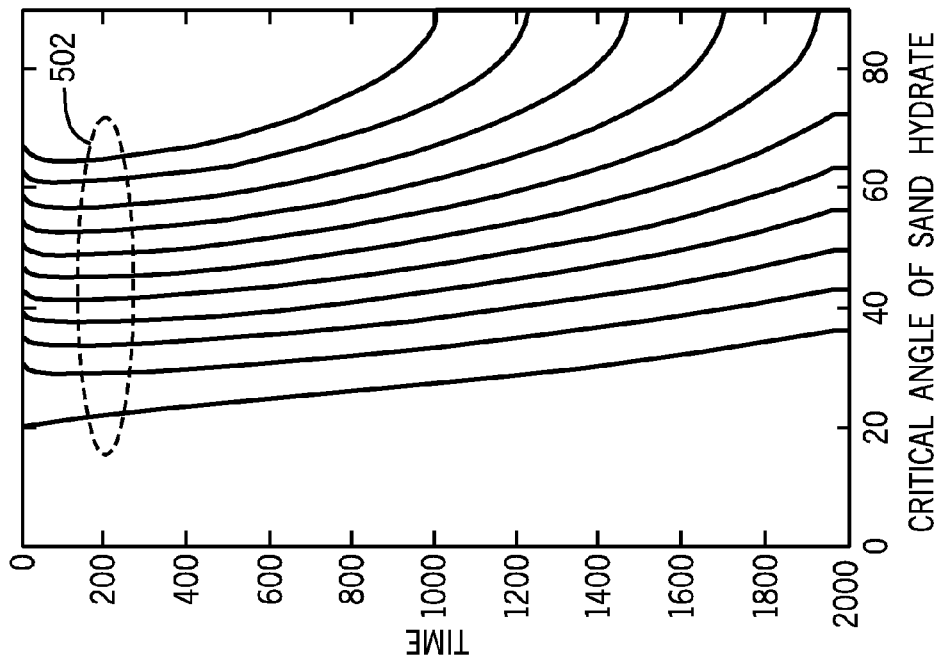

Exemplary implementations of the critical angle model created at 208 in FIG. 2 are described in connection with FIGS. 5A and 5B. In each of FIGS. 5A and 5B, the vertical axis represents time (starting from the earth surface, time=0, and proceeding to greater depths of a subterranean structure, for time>0). The horizontal axis of each graph in FIG. 5A or 5B represents critical angle. FIG. 5A is a graph for a gas hydrate-bearing sand formation, while FIG. 5B is a graph for a gas hydrate-bearing shale formation.

Multiple curves (in a set 502) are depicted in FIG. 5A, where each curve defines a relationship between time (or depth) and critical angle. The left-most curve in FIG. 5A is a critical angle curve for the gas hydrate-bearing sand formation that is 100% saturated (the pores of the sand formation are 100% filled with gas hydrate), while the right-most curve in the collection 502 is a critical angle curve for the gas hydrate-bearing sand formation that is 0% saturated (there is no gas hydrate in the sand formation). As can be seen from FIG. 5A, increasing concentrations (increasing saturation) of the sand results in reduced critical angles (as indicated by the curves in set 502 going from right to left).

A similar type of relationship is depicted by curves 504 in the graph of FIG. 5B for different saturations of gas hydrate in a shale formation. The left-most curve in the collection 504 is a critical angle curve for the shale formation that is 100% saturated with gas hydrate, whereas the right-most curve is a critical angle curve for the shale formation that is 0% saturated.

The critical angle curves in the sets 502 and 504 are derived using the Vp profiles represented by curves in respective collections 402 and 406 of FIGS. 4A and 4B, respectively. Based on velocity profiles, critical angle can be calculated at each depth/time for different hydrate saturations, using Snell's law. Snell's law describes the relationship between angles of incidence and refraction, when referring to waves passing through a boundary between two different media.

The critical angle variation with depth/time and hydrate concentration (saturation) as depicted in FIGS. 5A and 5B, constitute the critical angle models for a gas hydrate-bearing sand formation and a gas hydrate-bearing shale formation, respectively. Note that the critical angle increases with depth, for a given amount of hydrate concentration. However, as noted above, the critical angle decreases with increase in gas hydrate concentration, at a given depth.

Figure 6:
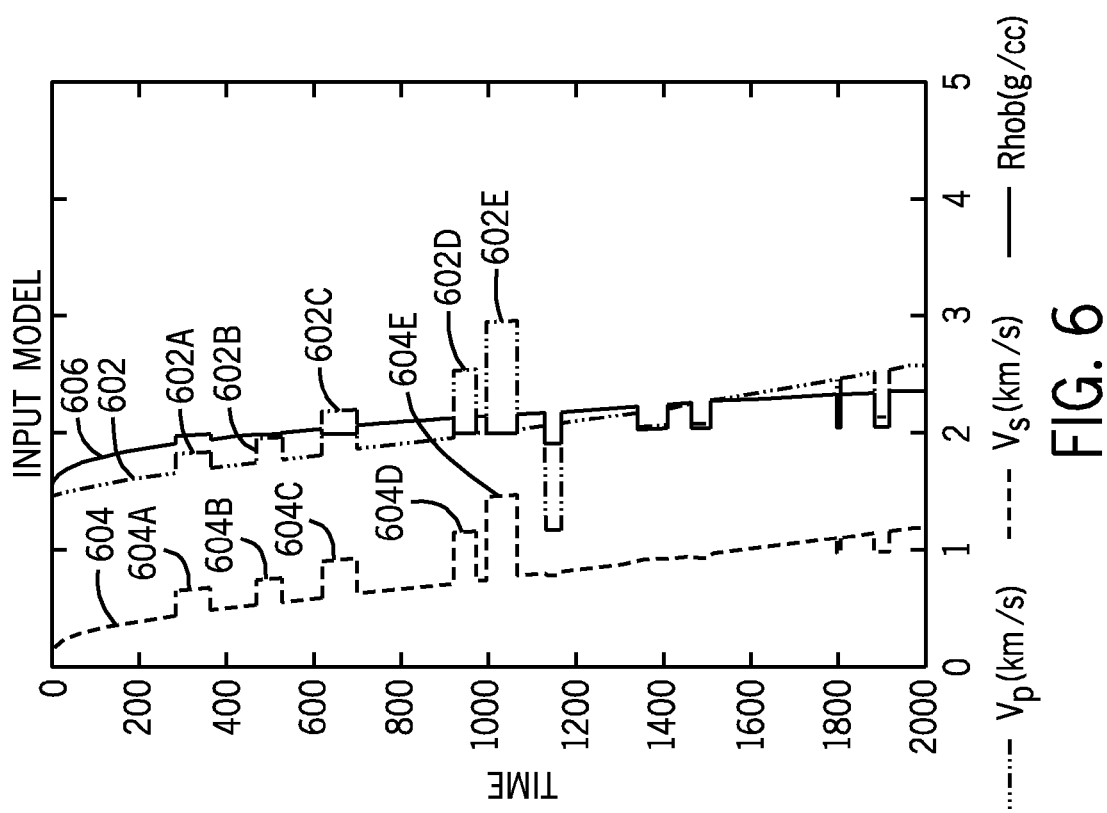
FIG. 6 is a graph including curves representing different elastic properties as a function of depth in a subterranean structure.

The creation of the critical angle profile (212 in FIG. 2) in accordance with some embodiments is described in connection with FIGS. 6-8. FIG. 6 represents a model of sand sublayers in a background shale formation. Three elastic properties are depicted by respective curves 602, 604, and 606 in the model of FIG. 6. The curve 602 represents Vp (velocity of P-wave) as a function of time (depth), the curve 604 represents Vs (velocity of S-wave) as a function of time (depth), and the curve 606 represents density (Rhob) as a function of time (depth). Each curve 602 and 604 has various pulses (e.g. 602A-602B and 604A-604E, respectively), that represents variations in the respective velocities (Vp and Vs, respectively) caused by presence of sand sublayers that contain gas hydrate.

As dictated by Snell's law, critical refraction of a wave (reflection of the wave at an angle of incidence greater than or equal to the critical angle) occurs at a boundary between different sublayers if the lower sublayer has a faster velocity than that of the upper sublayer. The critical angle decreases as the contrast of the different sublayers increases.

Large amplitude and phase changes in measurement seismic data at critical and super-critical angles (angles of incidence greater than the critical angle) provide a way to identify respective refraction events caused by critical angle refraction. Due to a velocity increase of a hydrate-bearing sediment relative to the background sediment layer, super-critical refractions occur as a result of the presence of gas hydrates in the system. By recognizing the relatively large amplitude and phase gradient anomalies in seismic traces containing the measurement seismic data, such as shown in FIG. 7, a critical angle profile based on the seismic traces (which are part of a seismic gather) can be defined.

Figure 7:
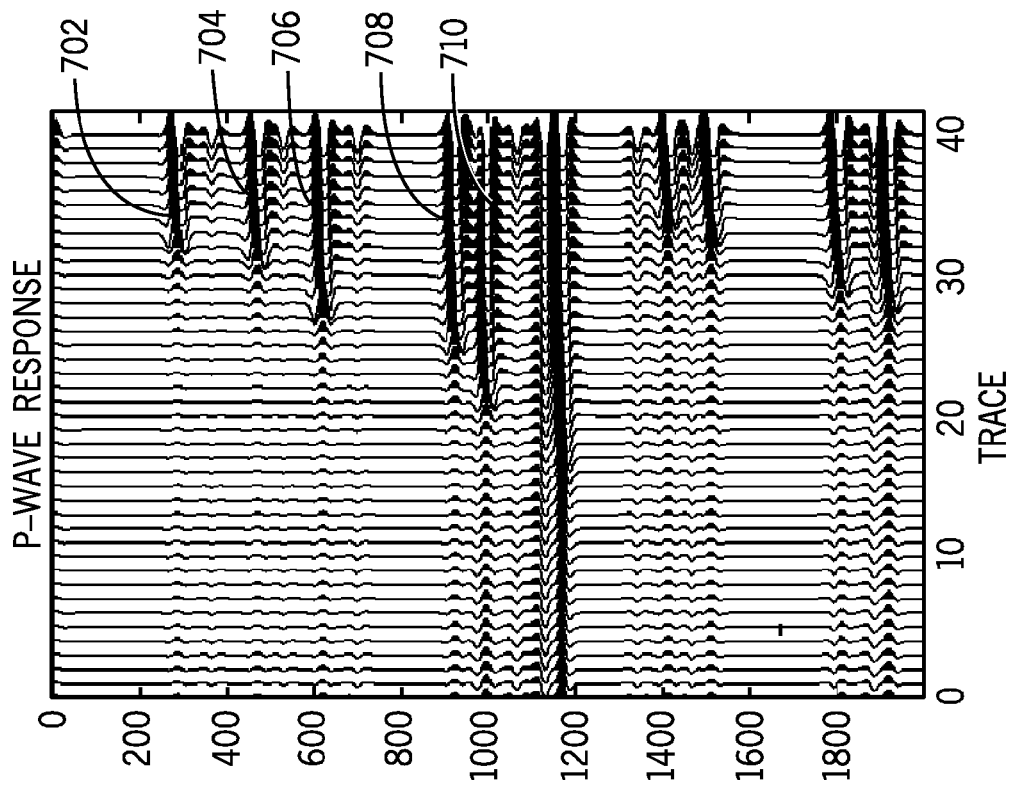
FIG. 7 is a graph of a seismic gather including seismic traces obtained for a subterranean structure.

FIG. 7 shows an example of a seismic gather (containing seismic traces 0, 1, ..., 40) based on a gas hydrate model with multiple hydrate-bearing sand layers in a shale background. The seismic traces represent the P-wave response in the sediment layer 118. Each seismic trace contains seismic data at corresponding different times (depths) along the vertical axis of the graph of FIG. 7.

The different seismic traces (trace 0, 1, ..., 40) are seismic traces collected for respective different angles of incidence of an incoming seismic wave (such as that generated by the seismic source 114 of FIG. 1). The angle of incidence increases from left to right in FIG. 7. Thus, for example, trace 0 includes the measurement data for an angle of incidence of 0°, and the subsequent traces 1-40 include measurement data for successively increasing angles of incidence. Once the angle of incidence reaches or exceeds the critical angle at a given depth, a relatively large amplitude and phase change occurs, as represented by the spikes 702-710 shown in FIG. 7, for example. These spikes in the seismic traces at the critical and super-critical angles of the sediment layer are due to the combined effect of the changes in lithology and gas hydrate saturation.

Figure 8:
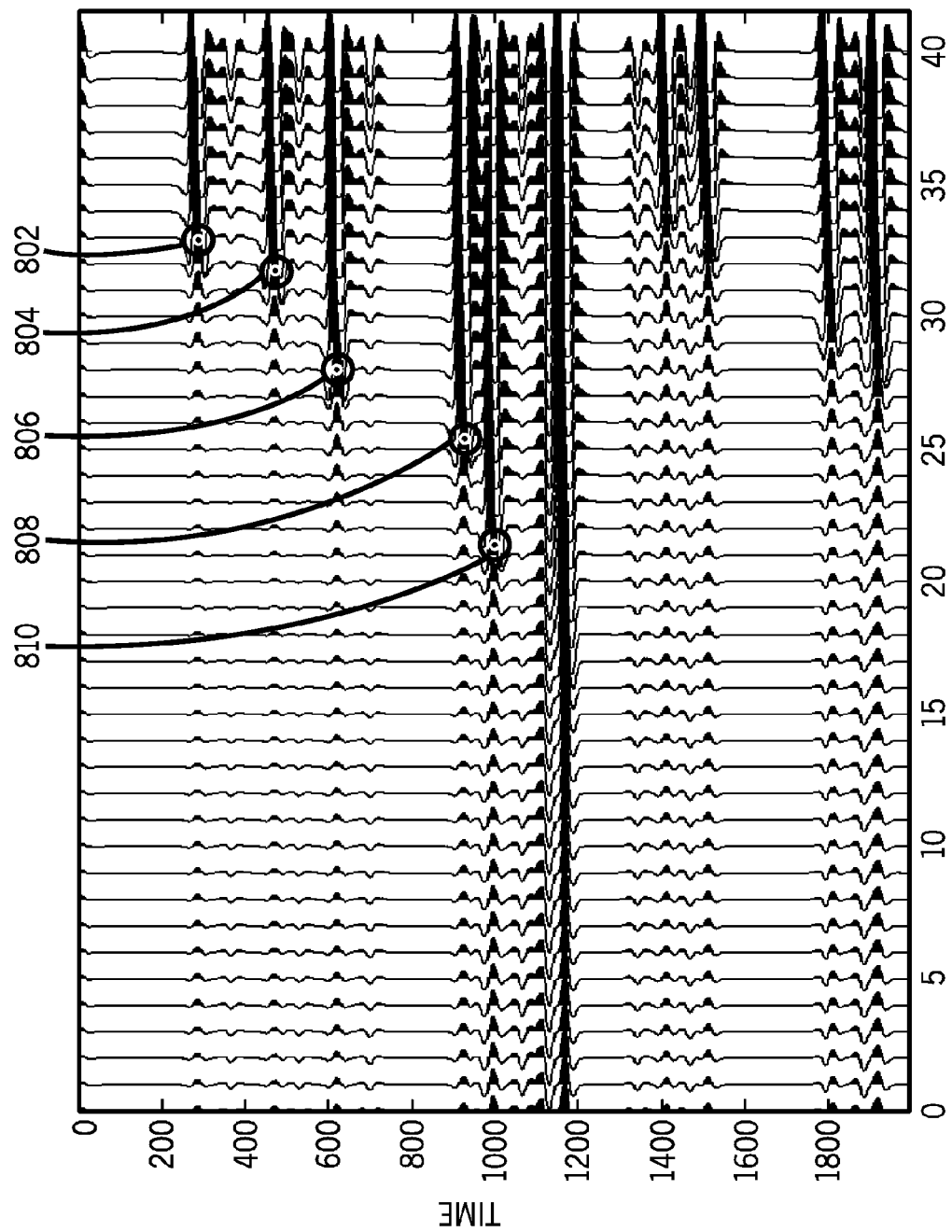
FIG. 8 illustrates a critical angle profile including critical angles determined based on the seismic traces of FIG. 7, according to some embodiments.

FIG. 8 is an enlarged view of the graph of FIG. 7, except that circles 802, 804, 806, 808, and 810 have been plotted in the graph to depict critical angles at different depths. In FIG. 8, the trace numbers shown in FIG. 7 have been replaced with respective angles of incidence. The critical angles represented by the circles 802, 804, 806, 808, and 810 form a critical angle profile as created at 212 in FIG. 2.

The following describes the gas hydrate quantity estimation (214 in FIG. 2), according to some embodiments. Once the gas hydrate critical angle model (e.g. FIG. 5A or 5B) created at 208 in FIG. 2 has been defined, and the critical angle profile (e.g. FIG. 8) created at 212 is provided, then gas hydrate quantities at different depths in the sediment layer 118 can be computed. Such computation can be performed using any suitable method, including without limitation, an inversion technique that correlates the critical angle model and the critical angle profile (with interpolation if needed), a Bayesian-type inversion technique, etc.

Figure 9:
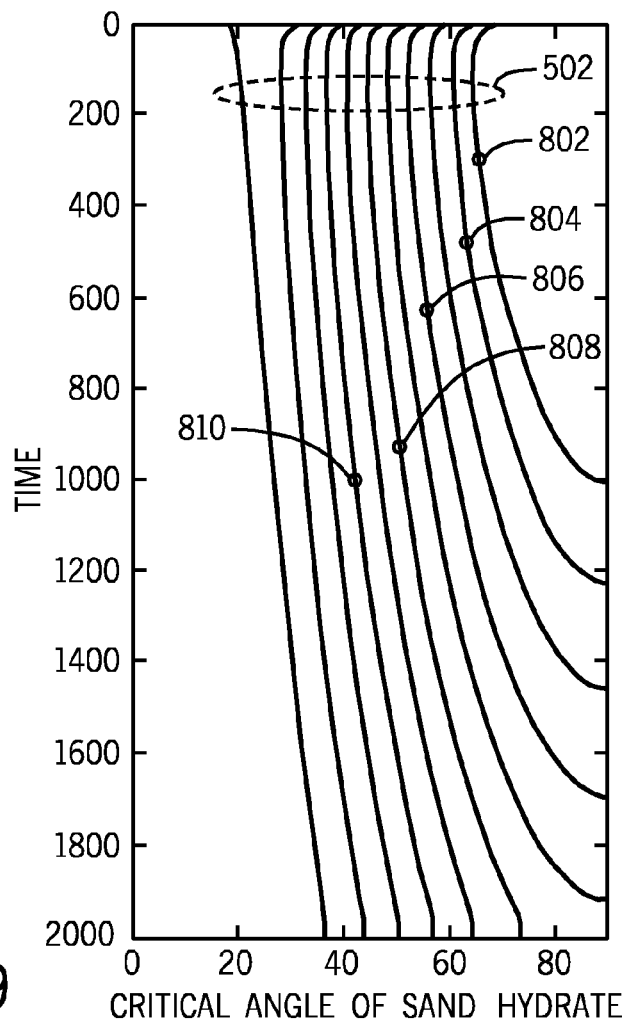
FIG. 9 illustrates a critical angle model that relates critical angle and depth/time with gas hydrate saturation, according to some embodiments.

Correlation between the critical angle model (represented by curves 502 in FIG. 9) and the critical angle profile (represented by circles 802, 804, 806, 808, and 810) is depicted in FIG. 9. In the non-limiting example of FIG. 9, each of the circles 802-810 map onto a respective curve in the set 502. Since each of the curves in the set 502 represents a respective saturation level (from 0 to 100% from right to left of gas hydrate), mapping of a circle (802-810) onto a particular curve allows for a determination of the respective saturation level at a given depth. If a particular one of the circles 802-810 cannot be mapped onto a curve in the set 502, then interpolation can be performed to compute the respective gas hydrate saturation level. Once the saturation levels at different depths are determined using the correlation according to FIG. 9, then one or more of these saturation levels (or other quantities of gas hydrate computed based on the saturation levels) can be output as the estimated quantities (214 in FIG. 2).

In alternative implementations, instead of using the correlation technique according to FIG. 9, a Bayesian-type of inversion can be performed. With the Bayesian-type inversion, an estimated quantity of gas hydrate can be derived using a maximum a posteriori (MAP) technique. With Bayesian statistics, the MAP technique can be used to obtain an estimate of an unobserved quantity (in this case a quantity of gas hydrate) on the basis of empirical data.

The posteriori probability of a gas hydrate-bearing sand formation with a certain saturation (sgh) for a given critical angle (ca) at depth/time z, p(z,sgh|ca), may be calculated through Bayesian analysis expressed in Eq. 1 below:

$$p(z,sgh|ca)=p(z,sgh)*p(ca|z,sgh)/p(ca) \qquad \text{(Eq. 1)}$$

where p(ca|z,sgh) is the likelihood PDF (probability distribution function) constructed from the critical angle model, p(z, sgh) is the prior information, and p(ca) is the summation of the probability for all the classes (sgh, ca, and z). The PDF, p(ca|z,sgh), is a function depth (z), hydrate saturation (sgh), and critical angle (ca), where the critical angle (ca) is used as the sampling basis. The sgh is estimated using the foregoing formulation by using the MAP technique, in some implementations.

Figure 10:
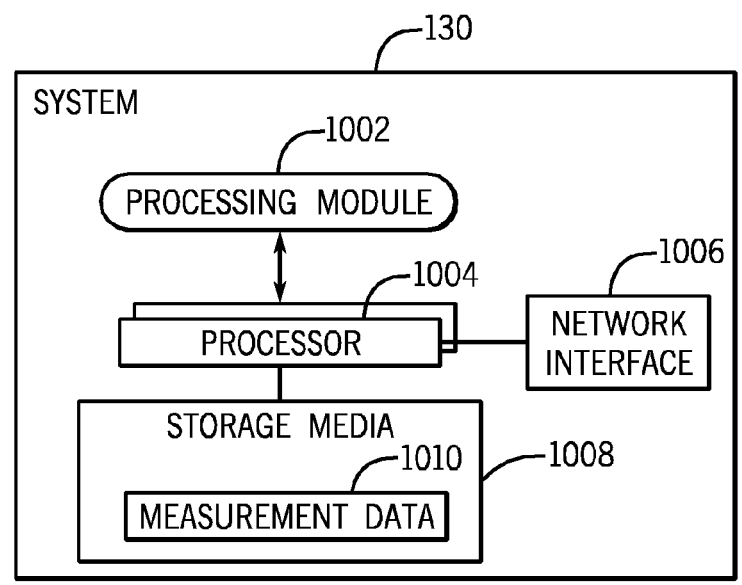
FIG. 10 is a block diagram of a control system according to some embodiments.

FIG. 10 is a block diagram of an example control system 130 that can perform the processing of FIG. 2 and other techniques discussed above. The control system 130 is a type of system that is able to perform control and/or processing tasks. A "system" can refer to a system having a single computer, or a distributed arrangement of multiple computers.

The control system 130 includes a processing module 1002, which can perform various techniques discussed above. The processing module 1002 is executable on one or more processors 1004, which are connected to storage media 1008 and a network interface 1006. The network interface 1006 allows the control system 130 to communicate over a network. The storage media 1008 can store measurement data 1010, such as the measurement data acquired by a survey arrangement.

Machine-readable instructions of the processing module 1002 are executed on the processor(s) 1004. A processor can include a microprocessor, microcontroller, processor module or subsystem, programmable integrated circuit, programmable gate array, or another control or computing device.

The storage media 1008 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   producing, by a system including a processor, a profile based on measured survey data, wherein the profile contains indications corresponding to refraction events at different depths in a subterranean structure; and
   determining, by the system, based on the profile and a critical angle model that correlates different concentrations of a given material to respective critical angles, a quantity of the given material in the subterranean structure at a particular depth.

2. The method of claim 1, wherein producing the profile comprises producing a critical angle profile based on the measured survey data, wherein the critical angle profile includes one or more critical angles in the subterranean structure at different depths.

3. The method of claim 2, wherein the determining comprises correlating at least one of the one or more critical angles in the critical angle profile to curves of the critical angle model corresponding to the different concentrations, where one or more of the curves map critical angle to depth in the subterranean structure.

4. The method of claim 3, further comprising:
   in response to determining that a first critical angle in the critical angle profile cannot be mapped directly onto any of the curves of the critical angle model, performing interpolation to determine a quantity of the given material corresponding to the first critical angle in the critical angle profile.

5. The method of claim 2, further comprising:
   receiving seismic traces corresponding to respective different angles of incidence of source seismic waves; and
   estimating the one or more critical angles at the different depths based on the refraction events indicated by the seismic traces.

6. The method of claim 1, wherein the determining comprises performing inversion, using the critical angle model, of the profile to derive the quantity of the given material in the subterranean structure at the particular depth.

7. The method of claim 6, wherein performing the inversion comprising performing inversion according to a Bayesian technique.

8. The method of claim 1, further comprising:
   creating a rock physics model of the subterranean structure that accounts for different concentrations of the given material in the subterranean structure; and
   producing, based on the rock physics model, the critical angle model.

9. The method of claim 8, wherein creating the rock physics model includes mapping velocities of seismic waves to depth in the subterranean structure for different concentrations of the given material in the subterranean structure.

10. The method of claim 1, wherein the critical angle model includes curves corresponding to the respective different concentrations, each of the curves representing critical angles between sublayers at respective depths in the subterranean structure.

11. The method of claim 10, wherein each of the critical angles is between a respective pair of the sublayers at a corresponding one of the respective depths.

12. The method of claim 1, wherein determining the quantity of the given material comprises determining a concentration or saturation level of the given material.

13. A system comprising:
    a storage medium to store measurement data acquired during a subterranean survey operation; and
    at least one processor configured to:
      produce a profile based on the measurement data, wherein the profile contains indications corresponding to refraction events at different depths in a subterranean structure;
      create a critical angle model that correlates different concentrations of a given material to respective critical angles between sublayers at respective depths in the subterranean structure; and
      determine, based on the profile and the critical angle model, a quantity of the given material in the subterranean structure at a particular depth.

14. The system of claim 13, wherein the critical angle model includes curves corresponding to the different concentrations, where one or more of the curves maps critical angle to depth in the subterranean structure.

15. The system of claim 14, wherein the profile comprises a critical angle profile based on the measurement data, where the critical angle profile includes critical angles in the subterranean structure at different depths.

16. The system of claim 15, wherein the at least one processor is further configured to invert the critical angle profile using the critical angle model to determine the quantity of the given material.

17. The system of claim 15, wherein the measurement data includes seismic traces corresponding to respective different angles of incidence of source seismic waves, and wherein the at least one processor is further configured to further:

estimate the critical angles at the different depths based on the refraction events indicated by the seismic traces.

18. An article comprising at least one non-transitory machine-readable storage medium storing instructions that upon execution cause at least one processor to:

produce a critical angle profile based on measured survey data, wherein the critical angle profile includes critical angles in the subterranean structure at different depths; and determine, based on the critical angle profile and a critical angle model that correlates different concentrations of a given material to respective critical angles between sublayers at corresponding depths in the subterranean structure, quantities of the given material in the subterranean structure at respective depths.

19. The article of claim 18, wherein the given material comprises a gas hydrate.

20. The article of claim 18, wherein the instructions upon execution cause the at least one processor to further:

create a rock physics model of the subterranean structure that accounts for different concentrations of the given material in the subterranean structure; and create the critical angle model using the rock physics model.

21. The article of claim 20, wherein creating the rock physics model comprises mapping velocities of seismic waves to depth in the subterranean structure for different concentrations of the given material in the subterranean structure.

* * * * *